(12) United States Patent
Zetterberg et al.

(10) Patent No.: US 10,555,261 B2
(45) Date of Patent: Feb. 4, 2020

(54) NETWORK NODE AND METHODS THEREIN FOR MONITORING SYSTEM COVERAGE IN A WIRELESS COMMUNICATION NETWORK

(71) Applicant: TELEFONAKTIEBOLAGET LM ERICSSON (PUBL), Stockholm (SE)

(72) Inventors: Kristina Zetterberg, Linköping (SE); Icaro L. J. Da Silva, Solna (SE); Pål Frenger, Linköping (SE); Fredrik Gunnarsson, Linköping (SE); Reza Moosavi, Linköping (SE); Pradeepa Ramachandra, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 49 days.

(21) Appl. No.: 15/568,378

(22) PCT Filed: Sep. 25, 2017

(86) PCT No.: PCT/SE2017/050922
§ 371 (c)(1),
(2) Date: Oct. 20, 2017

(87) PCT Pub. No.: WO2018/067054
PCT Pub. Date: Apr. 12, 2018

(65) Prior Publication Data
US 2018/0302856 A1    Oct. 18, 2018

Related U.S. Application Data

(60) Provisional application No. 62/405,311, filed on Oct. 7, 2016.

(51) Int. Cl.
*H04W 52/02* (2009.01)
*H04W 72/00* (2009.01)
(Continued)

(52) U.S. Cl.
CPC ....... *H04W 52/0229* (2013.01); *H04L 5/0023* (2013.01); *H04W 24/10* (2013.01);
(Continued)

(58) Field of Classification Search
CPC .......... H04W 52/0229; H04W 72/005; H04W 76/27; H04W 76/30; H04W 24/10;
(Continued)

(56) References Cited

U.S. PATENT DOCUMENTS

| 8,781,475 B1 | 7/2014 | McKeeman et al. | |
| 2014/0315549 A1* | 10/2014 | Zhang | H04W 48/08 455/434 |

(Continued)

OTHER PUBLICATIONS

International Search Report and Written Opinion issued in Application No. PCT/SE2017/050922 dated Dec. 15, 2017, 16 pages.
(Continued)

*Primary Examiner* — Omar J Ghowrwal
(74) *Attorney, Agent, or Firm* — Rothwell, Figg, Ernst & Manbeck, P.C.

(57) ABSTRACT

A first network node (111) and method therein for monitoring inactive mode coverage for a user equipment (130) in a wireless communication network (100) are disclosed. A plurality of network nodes (111, 112) operate in the wireless communication network (100) and the first network node (111) is a serving network node for the user equipment (130). The first network node (111) receives an inactive mode coverage monitoring report. The first network node (111) analyzes the inactive mode coverage monitoring report and determines whether the user equipment (130) has inactive mode coverage based on the outcome of analysing the inactive mode coverage monitoring report.

33 Claims, 9 Drawing Sheets

(51) Int. Cl.
| | |
|---|---|
| *H04L 5/00* | (2006.01) |
| *H04W 76/27* | (2018.01) |
| *H04W 76/30* | (2018.01) |
| *H04W 24/10* | (2009.01) |
| *H04W 24/02* | (2009.01) |

(52) U.S. Cl.
CPC ......... *H04W 72/005* (2013.01); *H04W 76/27* (2018.02); *H04W 76/30* (2018.02); *H04W 24/02* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01)

(58) Field of Classification Search
CPC ..... H04W 24/02; H04L 5/0023; Y02D 70/00; Y02D 70/146; Y02D 70/21; Y02D 70/1264; Y02D 70/142; Y02D 70/1242; Y02D 70/1262
See application file for complete search history.

(56) References Cited

U.S. PATENT DOCUMENTS

| | | | |
|---|---|---|---|
| 2015/0289195 A1* | 10/2015 | Gogic | H04W 48/06 370/230 |
| 2016/0269912 A1 | 9/2016 | Chaudhuri et al. | |
| 2017/0078865 A1* | 3/2017 | Santhanam | H04L 5/001 |
| 2017/0127397 A1* | 5/2017 | Hahn | H04W 28/0236 |
| 2017/0181067 A1* | 6/2017 | Schier | H04W 24/02 |
| 2017/0245229 A1* | 8/2017 | Seo | H04W 24/04 |
| 2017/0331613 A1* | 11/2017 | Ly | H04L 7/0008 |
| 2017/0373907 A1* | 12/2017 | Tan | H04L 5/0091 |
| 2019/0074953 A1* | 3/2019 | Tooher | H04L 5/0057 |

OTHER PUBLICATIONS

ZTE, ZTE Microelectronics, "Idle and Connected Mode Mobility in NR", 3GPP TSG RAN WG1 Meeting #86b, R1-1608970, Lisbon, Portugal, Oct. 10-14, 2016, 4 pages.

Ericsson, "NR Synchronization signals for idle and connected mode mobility", 3GPP TSG-RAN WG1 Meeting #86bis, R1-1609668, Lisbon, Portugal, Oct. 10-14, 2016, 5 pages.

* cited by examiner

NETWORK NODE AND METHODS THEREIN FOR MONITORING SYSTEM COVERAGE IN A WIRELESS COMMUNICATION NETWORK

CROSS REFERENCE TO RELATED APPLICATION(S)

This application is a 35 U.S.C. § 371 National Stage of International Patent Application No. PCT/SE2017/050922, filed Sep. 25, 2017, designating the United States and claiming priority to U.S. provisional application No. 62/405,311, filed on Oct. 7, 2016. The above identified applications are incorporated by reference.

TECHNICAL FILED

Embodiments herein relate to a network node and method therein for monitoring system coverage in a wireless communication network. In particular, they relate to monitor inactive mode coverage for a user equipment in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a WI-FI access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network.

3GPP 5G New Radio (NR) is the wireless standard that will become the foundation for the next generation of mobile networks. FIG. 1 depicts an overview of the downlink (DL) based active mode mobility (AMM) solution proposed for 3GPP 5G NR.

As shown in FIG. 1, a UE is served by the leftmost network node, i.e. the serving node 1, but is traveling in the direction towards the rightmost network node 2, depicted by the dashed arrow in the figure. The UE uses the best "home MRS" (Mobility Reference Signal) for coarse timing estimation and radio link quality monitoring and failure detection, denoted by the dot filled oval in the figure. Alternative names instead of MRS may be Active mode synch signal (AMSS), active mode reference signal or Channel State Information Reference Signal (CSI-RS).

In addition, the UE monitors a sparse periodic MRS from the serving network node 1 and compares it with similar periodic and sparse MRSs from potential target network nodes, e.g. the network node 2. When a target network node becomes relevant for a more detailed handover procedure additional dynamically configured home MRSs from the serving network node 1 and dynamically configured away MRSs from the target network node, e.g. the network node 2, may be activated.

The final handover decision is taken by the network and it is based on UE reports containing measurements of home MRSs and away MRSs.

An example of a proposed system information acquisition for 5G NR is depicted in FIG. 2. In the example each network node, which may also be referred as RBS, eNB, gNB, transmission and reception point (TRP), transmits a synchronization signal or a system signature signal (SS). Together with the SS each network node also transmits a physical broadcast channel (PBCH) containing some of the minimum system information that the UE need to access the network. This part of the minimum system information is denoted as master information block (MIB) in the figure. The transmission of SS and the physical broadcast channel (PBCH) containing the MIB is denoted with dot filled ovals in the figure.

By reading the MIB the UE receives information on how to receive the system information block (SIB) table. The SIB table may be transmitted using a broadcast format such as single frequency network (SFN) transmission and it is depicted with a dashed oval in the figure.

In addition to the minimum system information that is periodically broadcasted in the SS+MIB and in the SIB-table the UE may receive other system information e.g. by a dedicated transmission after initial access is established, depicted with an oval with label "Additional SI transmission" in the figure.

In 5G NR, which is designed to support high gain and dynamic beamforming, e.g. by means of utilizing hundreds of antenna elements at the base station, so called massive multiple-input-multiple-output (MIMO). It is therefore possible to maintain a connection with a UE despite that it is beyond an idle mode coverage or inactive mode coverage of the serving network node. The idle or inactive mode coverage, also referred to as SS coverage or SS broadcast area or system area coverage, is defined by the system information or system signature signal coverage, of a network node. That is with 5G NR, the possibility of beam formed data transmissions enables a UE to travel far away from its serving network node with a maintained radio quality. This means that the UE could move out of the SS broadcast area, or system area, of the serving network node, but still be connected to the serving network node. As long as the UE is still within a serving area or SS coverage of another network node in the network, this will not be a problem. As a UE that is dropped of connection due to some reason could easily reconnect to the network by retrieving the system information from that node. However, if the UE moves in to an inactive mode coverage hole, i.e. an area where none of the network nodes in the network broadcasts an SS, a UE that drops connection will not be able to reconnect to the network. This is because the UE cannot retrieve the information needed to do initial access.

FIG. 3 depicts an example of the problems identified above in prior art. As shown in FIG. 3, the UE is in an area where there is no SS coverage from any base stations, e.g. SS1, SS2, SS3 from the network nodes 31, 32, 33 cannot reach the UE. This mismatch in active mode coverage and inactive mode coverage will create a number of problems. The active mode coverage means that the UE has a Radio Resource Control (RRC) connection and is involved in transmission and reception of packet burst (note that it needs not transmit/receive constantly). Inactive/idle mode or state means that the UE has no RRC state in the network node, meaning that it has no radio bearers configured.

Firstly, this may cause a false sense of security to a user. A user with a UE that has an active mode connection to the network is under the impression that it can use the UE to make an emergency call, or some other important call, in the same position. For example, a user is travelling with its boat further out in the sea, i.e. is moving out of the Inactive Mode Coverage of the network. In case the UE would lose connection, the user would turn the boat around and go closer to the harbour again. However, as the UE is still connected to the network, the user is under an impression that it will be possible to call for help if it is needed. When the UE battery runs out, the UE drops and loses the connection to the network. The user has a backup battery to power on the UE, and tries to reconnect to the network. This is however not possible, as the UE cannot retrieve the information needed to do initial access.

Secondly, this may cause comparison problem. For example, two users with the same operator are standing next to each other in an area with no Inactive Mode Coverage of the network. User A has an active mode connection between the UE and the network which started before he is moving in to the area, and the active mode connection is now supported through beam forming. User B picks up the phone to make a call, but cannot connect since his UE is unable to retrieve any access information to the network. User B may get disappointed with the operator since the same service is not provided for both users, even though they are at the same location, have the same subscription and are paying an equal amount of money to the operator.

SUMMARY

Therefore it is an object of embodiments herein to provide a technique for monitoring inactive mode coverage for a user equipment in a wireless communication network.

According to a first aspect the object is achieved by a method performed in a first network node for monitoring inactive mode coverage for a user equipment (UE) in a wireless communication network. A plurality of network nodes operates in the wireless communication network and the first network node is a serving network node for the user equipment.

The first network node receives an inactive mode coverage monitoring report.

The first network node analyses the inactive mode coverage monitoring report and determine whether the user equipment has inactive mode coverage based on the outcome of analysing the inactive mode coverage monitoring report.

According to some embodiments, the inactive mode coverage monitoring report comprises synchronization signals, SSs, monitoring report or system information, SI, signal monitoring report.

According to some embodiments, the first network node may send a monitoring request to the user equipment to monitor SSs or SI of the wireless communication network.

According to some embodiments, the first network node may send a monitoring request via enhancements to the Radio Resource Control (RRC) Connection Reconfiguration.

According to some embodiments, the first network node may provide a transmission gap or several transmission gaps to the UE for measuring SSs or SI of the wireless communication network.

According to some embodiments, the user equipment may be configured to keep measuring SS from the serving network node, at least at some occasions, and/or detect and measure neighbour SSs from neighbour network nodes, at least at some occasions.

According to some embodiments, the first network node may send a request to neighbouring network nodes for SS information to be used in analysing the monitoring report. The SS information may comprise SS periodicity and/or SS transmission occasions.

According to some embodiments, the first network node may receive the SI signal monitoring report from the user equipment and the SI signal monitoring report comprises SI challenge information received by the user equipment from a target network node.

According to some embodiments, the first network node may send a SI challenge request to a target network node and receive a SI challenge response containing a SI challenge information from the target network node to be used in analysing the monitoring report.

According to some embodiments, when it is determined from the inactive mode coverage monitoring report analysis that the UE does not have Inactive Mode Coverage, the first network node may send an indication to the user equipment for informing the user equipment of no inactive mode coverage. Alternatively, the first network node may release the connection to the user equipment or may indicate to the user equipment that the connection will be released after a timer has expired. In this case, the first network node may receive from the user equipment a request to prolong the timer.

According to some embodiments, the first network node may provide a dedicated SS coverage to the user equipment.

According to some embodiments, the first network node may send a SS retention configuration to the user equipment.

According to some embodiments, the retention configuration may comprise any one of:

a) a SS Retention Timer value;

b) a SS Retention search space or time-frequency resources where the dedicated SS is transmitted;

c) a random access and/or random access response configuration for Random Access (RA) in retention mode;

d) a SS Retention data configuration information comprising Cell-Specific Reference Signal (CRS), scrambling, identifiers, retransmission schemes.

According to some embodiments, the SS Retention Configuration may be transmitted via dedicated transmissions during active mode, or via broadcast information.

According to some embodiments, the first network node may request neighbouring network nodes to transmit beam formed SS in a direction of the user equipment.

According to a second aspect the object is achieved by a first network node for monitoring inactive mode coverage for a user equipment (UE) in a wireless communication network. A plurality of network nodes operate in the wireless communication network and the first network node is a serving network node for the user equipment.

The first network node is configured to receive an inactive mode coverage monitoring report.

The first network node is further configured to analyse the inactive mode coverage monitoring report and determine whether the user equipment has inactive mode coverage based on the outcome of analysing the inactive mode coverage monitoring report.

According to some embodiments, the inactive mode coverage monitoring report may comprise synchronization signals, SSs, monitoring report or system information, SI, signal monitoring report.

According to some embodiments, the first network node may be further configured to send a monitoring request to the user equipment to monitor SSs or SI of the wireless communication network.

According to some embodiments, the first network node may further be configured to send a monitoring request via enhancements to the Radio Resource Control (RRC) Connection Reconfiguration.

According to some embodiments, the first network node may be further configured to provide a transmission gap or several transmission gaps to the UE for measuring SSs or SI of the wireless communication network.

According to some embodiments, the user equipment may be configured to keep measuring SS from the serving network node, at least at some occasions, and/or detect and measure neighbour SSs from neighbour network nodes, at least at some occasions.

According to some embodiments, the first network node may be further configured to send a request to neighbouring network nodes for SS information to be used in analysing the monitoring report. The SS information may comprise SS periodicity and/or SS transmission occasions.

According to some embodiments, the first network node may be further configured to receive the SI signal monitoring report from the user equipment and the SI signal monitoring report comprises SI challenge information received by the user equipment from a target network node.

According to some embodiments, the first network node may be further configured to send a SI challenge request to a target network node and receive a SI challenge response containing a SI challenge information from the target network node to be used in analysing the monitoring report.

According to some embodiments, when it is determined from the inactive mode coverage monitoring report analysis that the UE does not have Inactive Mode Coverage, the first network node may be further configured to send an indication to the user equipment for informing the user equipment of no inactive mode coverage. Alternatively, the first network node may be further configured to release the connection to the user equipment or to indicate to the user equipment that the connection will be released after a timer has expired. In this case, the first network node may receive from the user equipment a request to prolong the timer.

According to some embodiments, the first network node may be further configured to provide a dedicated SS coverage to the user equipment.

According to some embodiments, the first network node may be further configured to send a SS retention configuration to the user equipment.

According to some embodiments, the retention configuration may comprise any one of:
a) a SS Retention Timer value;
b) a SS Retention search space or time-frequency resources where the dedicated SS is transmitted;
c) a random access and/or random access response configuration for Random Access (RA) in retention mode;
d) a SS Retention data configuration information comprising Cell-Specific Reference Signal (CRS), scrambling, identifiers, retransmission schemes.

According to some embodiments, the SS Retention Configuration may be transmitted via dedicated transmissions during active mode, or via broadcast information.

According to some embodiments, the first network node may be further configured to request neighbouring network nodes to transmit beam formed SS in a direction of the user equipment.

According to the embodiments herein, an inactive mode coverage monitoring report for a UE is received and analyzed. The UE may be requested to monitor its inactive mode coverage, i.e. the SS or SI at regular occasions. If it is detected that the UE do not have Inactive Mode Coverage, the network can either drop the connection, or make preparations to be able to help the UE to reconnect if it drops connection. For example, the network node may through temporary, beam formed system information transmissions, i.e. provide a dedicated SS coverage to the user equipment, to help the UE establish a connection again. The network node may also indicate to the UE that it does not have Inactive Mode Coverage.

With the proposed solutions, situations where a false sense of security is given to the user, as well as situations with unhappy customers experiencing the comparison problem, may be avoided. In the case where a UE with an especially important ongoing call, such as an emergency call, moves out of the Inactive Mode Coverage area, the network could make preparations to help the UE to reconnect if it drops connection, for example through temporary, beam formed system information transmissions, i.e. a SS retention procedure to re-establish a connection.

Therefore by letting the UE monitor and report on the SS or SI, it may be detected when a UE moves out of the SS or SI coverage. The serving base station may notify the UE and/or release the connection. The serving base station may also beam form the SS towards the UE in case it drops connection, in order to enable the possibility to reconnect to the network.

BRIEF DESCRIPTION OF THE DRAWINGS

Examples of embodiments herein are described in more detail with reference to attached drawings in which.

DETAILED DESCRIPTION

Figure 1:
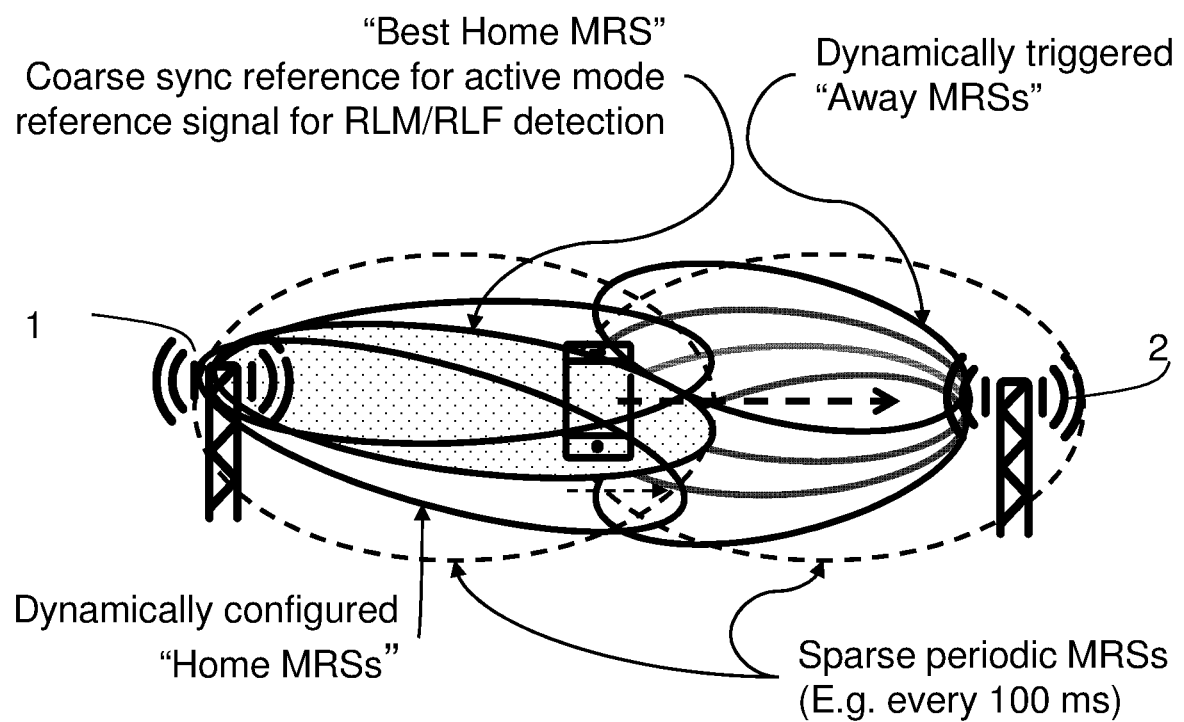
FIG. 1 is a schematic block diagram illustrating an overview of downlink based active mode mobility.
Figure 2:
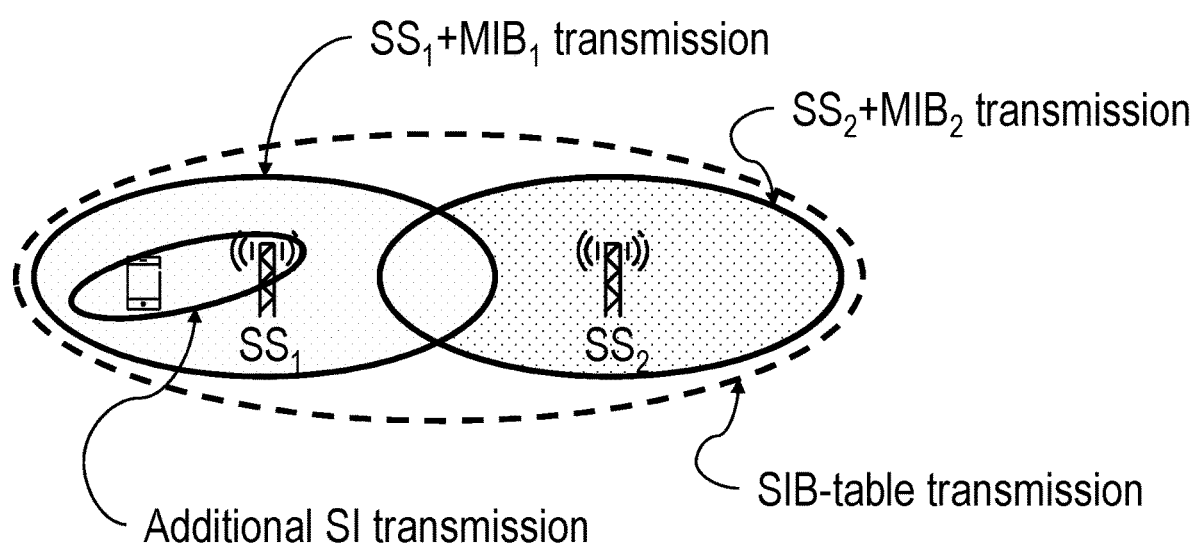
FIG. 2 is a schematic block diagram illustrating an example of system information acquisition.
Figure 3:
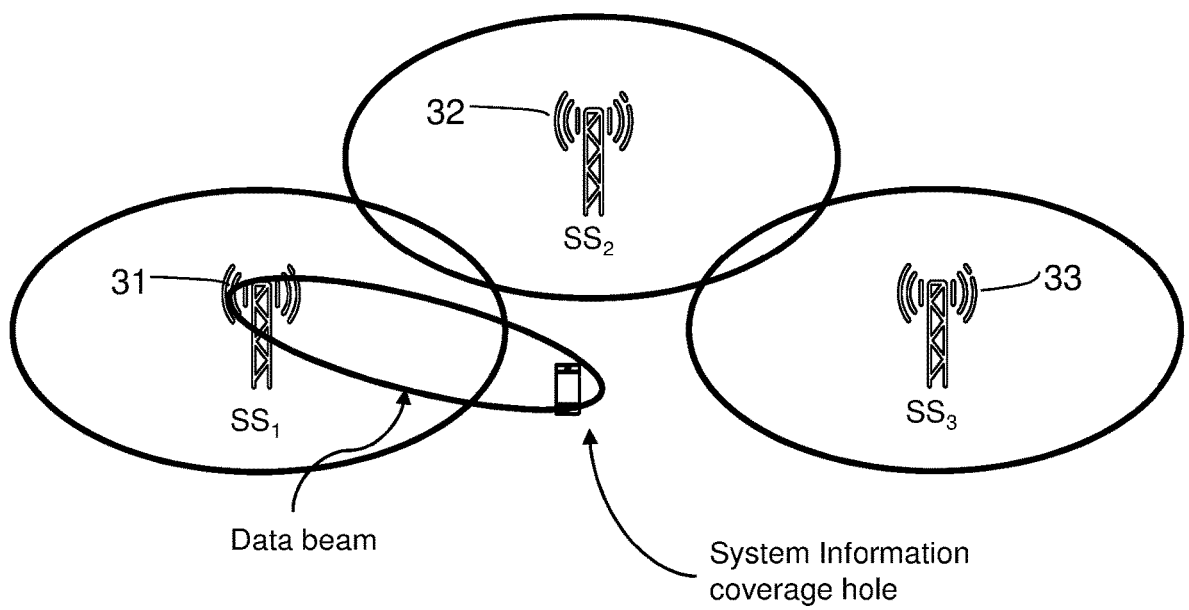
FIG. 3 is a schematic block diagram depicting an example of problems of prior art.
Figure 4:
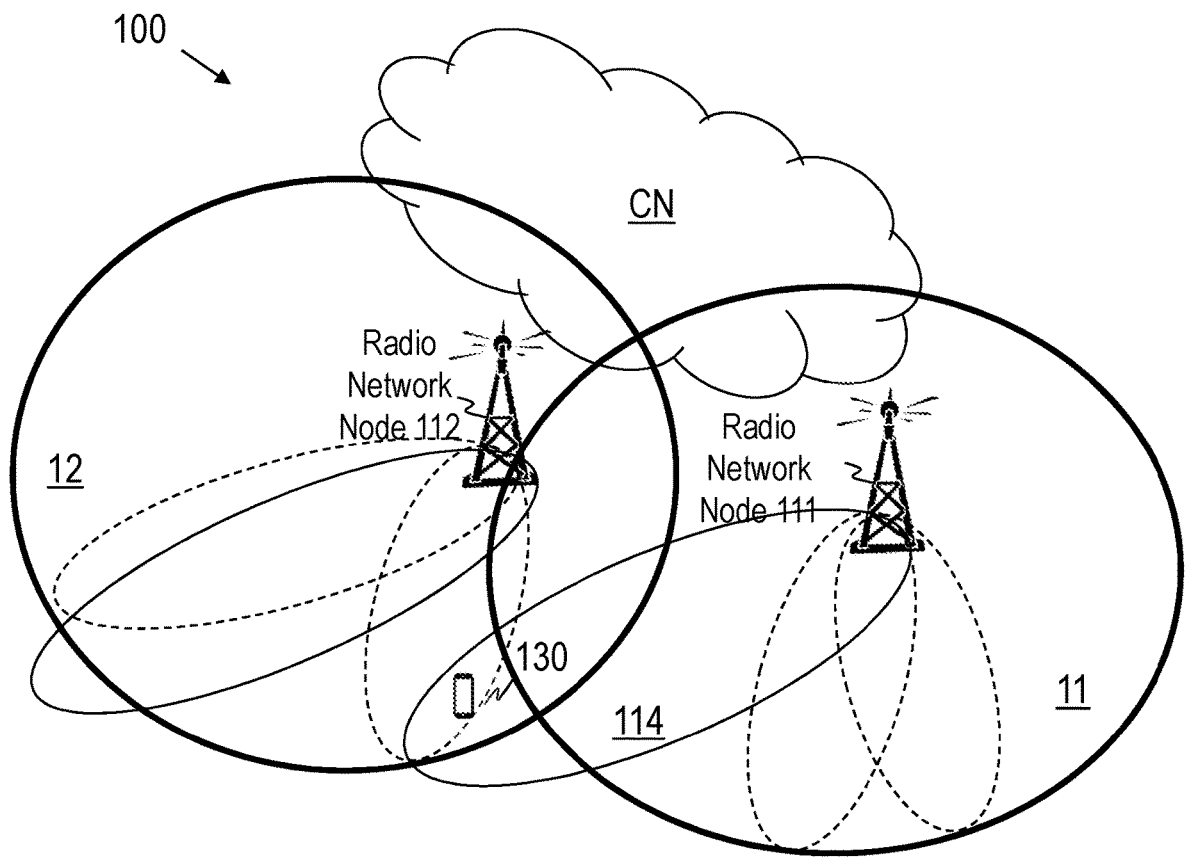
FIG. 4 is a schematic block diagram depicting embodiments of a communication system.

Embodiments herein relate to a communication networks in general. FIG. 4 is a schematic overview depicting a communication network 100. The communication network 100 may be a wireless communications network comprising one or more RANs and one or more CNs. The communication network 100 may use a number of different technologies, such as WI-FI, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WI-MAX), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, wireless devices e.g. a user equipment 130 such as a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell. The terms user equipment 130, UE, UE 130 and wireless device 130 are used interchangeable herein.

Network nodes operate in the wireless communication network 100 such as a first network node 111 and a second network node 112. The first network node 111 provides radio coverage over a geographical area, a service area 11, which may also be referred to as a SS broadcast area, or system area, or a beam or a beam group where the group of beams is covering the service area of a Radio Access Technology (RAT), such as 5G, LTE, WI-FI or similar. The second network node 112 provides radio coverage over a geographical area, a service area 12, which may also be referred to as a SS broadcast area, or system area, or a beam or a beam group where the group of beams is covering the service area of a RAT, such as 5G, LTE, WI-FI or similar. As shown in FIG. 4, the UE 130 is served by a data beam 114, i.e. an active mode beam, from the first network node 111, but with System Information coverage, i.e. the service area 12, from the second network node 112.

The first and second network nodes 111 and 112 may be a transmission and reception point e.g. a radio access network node such as a Wireless Local Area Network (WLAN) access point or an Access Point Station (AP STA), an access controller, a base station, e.g. a radio base station such as a NodeB, a gNB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the respective first and second network nodes 111 and 112 depending e.g. on the first radio access technology and terminology used. The first and second network nodes 111 and 112 may be referred to as a serving radio network node and communicates with the wireless device 120 with Downlink (DL) transmissions to the user equipment 130 and Uplink (UL) transmissions from the wireless device 130.

Figure 5:
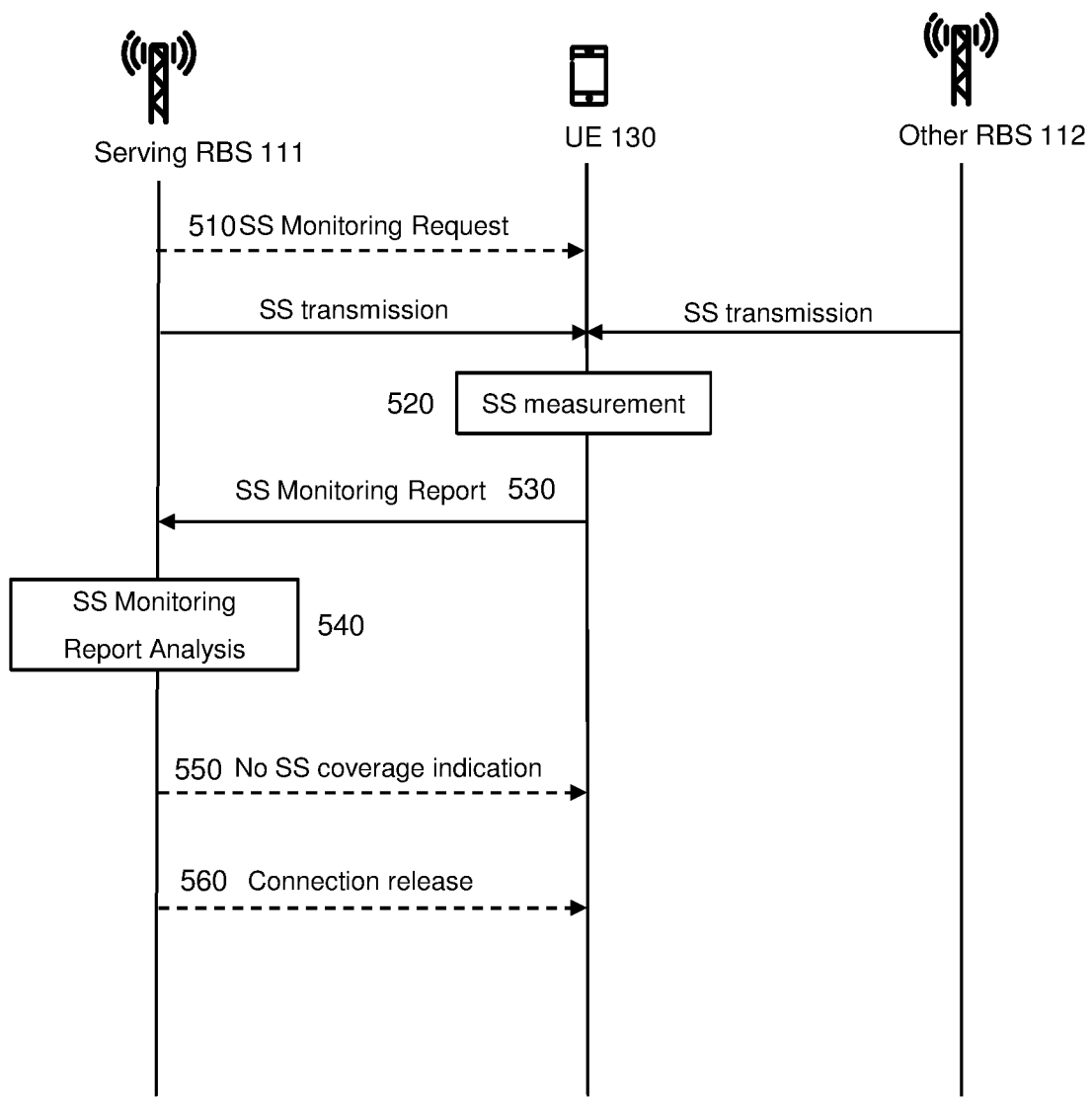
FIG. 5 is a signaling diagram illustrating embodiments of a method in a network node.

A signal flow chart of an example method performed in a wireless communication network 100 for monitoring system coverage or inactive mode coverage for a UE according to embodiments herein is illustrated in FIG. 5.

As described in the background, the idle or inactive mode coverage, also referred to as SS coverage or SS broadcast area or system area coverage, system coverage, is defined by the system information or system signature signal coverage of a network node. So please note that the terms "idle or inactive mode coverage", "SS coverage or SS broadcast area", "system area coverage", "system coverage" are used interchangeably in this document.

The steps of the embodiment are described below.

In a first, optional step 510, the Serving base station RBS, i.e. the network node 111, sends a request to the UE 130 to monitor SSs of the wireless communication network 100.

According to some embodiments, this is done via enhancements to the Radio Resource Control (RRC) Connection Reconfiguration.

If the request does not come until a time window has expired the UE 130 may discard the information about the accessed SS.

Optionally, the serving Base Station RBS 111 may provide a transmission gap or several transmission gaps to the UE 130, in which the UE 130 may measure, in step 520, for SS transmissions.

The UE 130 may be configured to keep measuring its SS from the serving RBS 111, at least at some occasions, and/or detect and measure neighbor SSs from the neighbor network nodes, at least at some occasions.

The UE 130 sends a report, e.g. an SS Monitoring report, in step 530, containing information related to the measurement, to indicate that it has a SS Coverage, independent of whether the SS is transmitted from serving Base Station 111 or by some other Base Stations, e.g. the network node 112, in the wireless communication network 100.

In case no SS is detected, the UE 130 may send a report to the serving Base Station 111 to indicate lack of SS coverage.

In an alternative mode, the UE may refrain from sending a report in case no SS coverage has been detected.

The serving base station 111 makes, in step 540, an SS Monitoring Report Analysis, in which it determines whether the UE has SS coverage or not.

In case the SS Monitoring Report Analysis shows that the UE does not have Inactive Mode Coverage, the serving Base Station 111 may perform differently according to the following alternatives.

According to one embodiment, the serving Base Station 111 may, in step 550, send a "No SS coverage indication" to the UE. This may be used to indicate to the user that it will not be able to reconnect to the network upon a connection drop.

According to one embodiment, the serving Base Station 111 may optionally release the connection to the UE, in step 560.

According to one embodiment, the serving Base Station 111 may optionally indicate to the UE that the connection will be released after a timer has expired. Optionally, the UE may respond to the serving Base Station 111 to request a prolonged timer.

According to some embodiments, the serving base station RBS 111 may request neighboring base stations for information which can be used in the SS Monitoring Report Analysis to verify that the UE 130 do have SS coverage from the wireless communication network 100. Such information may include SS periodicity and/or SS transmission occasions, etc.

In order to minimize the signaling needed for determining if the UE 130 has inactive mode coverage, there are two different ways:

According to one embodiment, the UE 130 may not send the SS Monitoring report in case no SS was found, i.e. no SS Monitoring report is received in the serving base station 111. The absence of an SS Monitoring Report from the UE 130 may be then interpreted as a negative-acknowledgement (NACK), i.e. that the UE do not have SS Coverage, by the serving base station 111.

According to one embodiment, the UE 130 may not send the SS Monitoring report in case one or more SS is found. The absence of an SS Monitoring Report from the UE 130 may then be interpreted as an indication of SS Coverage by the serving base station 130.

According to some embodiments, the serving Base Station RBS 111 may, for example if the call is identified as prioritized, for example an emergency call or a call of a "Gold user", try to provide a dedicated SS coverage after the release of the connection, which may be referred to as SS Retention. In this case the serving Base Station RBS 111 may still keep the connection to the UE even upon receiving a NACK in the SS Monitoring Report. In case the UE eventually drops connection, the serving base station RBS 111 may transmit beam formed SS in the latest known direction of the UE 130, and possibly in nearby directions, during a limited time, in order to enable the possibility to reconnect to the wireless communication network 100 for the UE 130.

Figure 6:
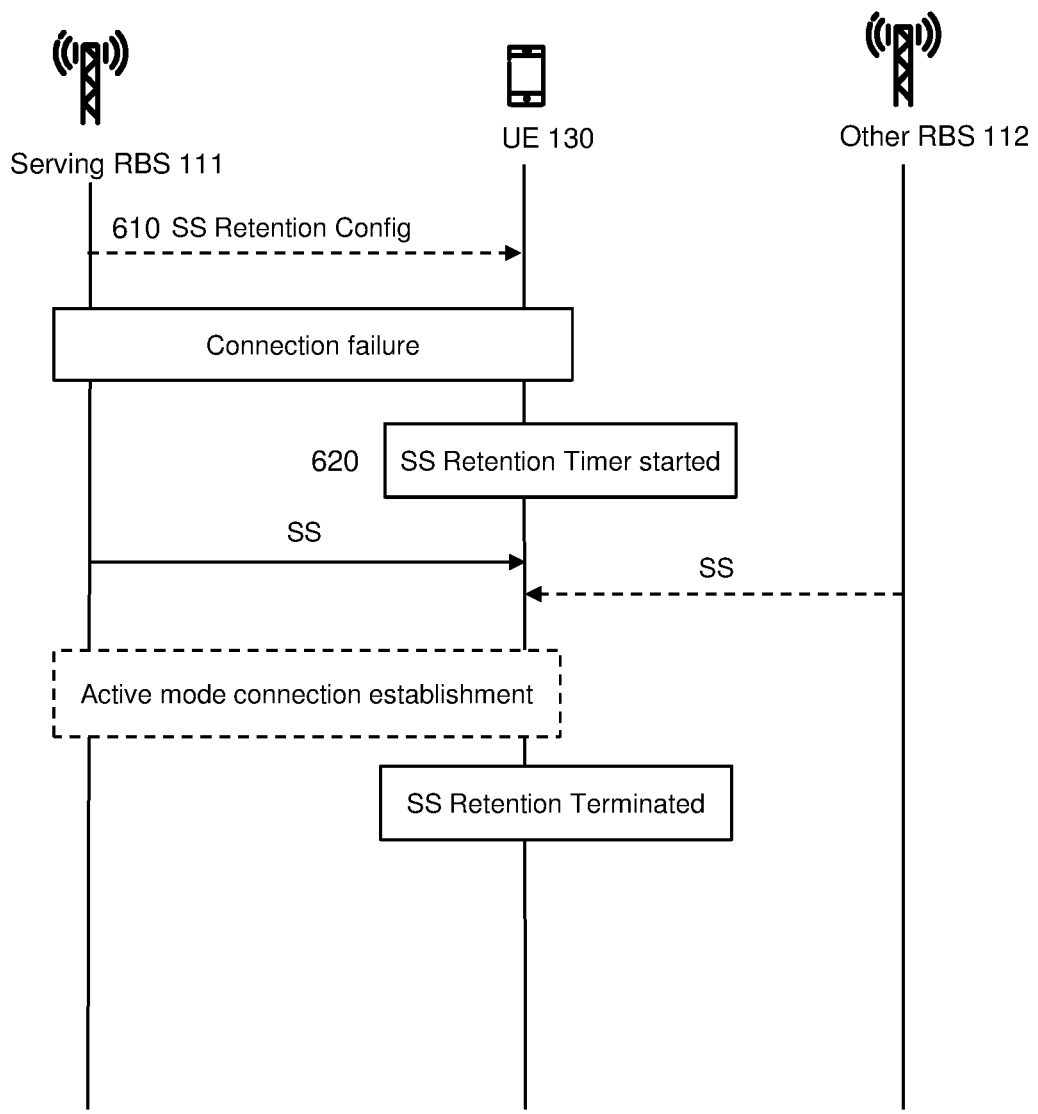
FIG. 6 is a signaling diagram illustrating embodiments of a method in a network node.

A signal flow chart describing an example of a SS retention procedure is illustrated by FIG. 6, which comprises the following actions or steps:

The serving network node RBS 111 may, in step 610, send a SS Retention Configuration to the UE 130.

According to some embodiments, the UE 130 may be configured with the SS Retention Configuration which may comprises:

- a SS Retention Timer value. The SS Retention Timer value is to inform about for how long the network will try to maintain SS coverage for the UE 130 after a drop or loss of connection. This is shown in FIG. 6, in step 620, where when the SS Retention Timer started, the network will try to maintain SS coverage until an Active mode connection is established, then the SS retention procedure is terminated;
- a SS Retention search space or time-frequency resources where the dedicated SS will be transmitted;
- a random access and/or random access response configuration for Random Access (RA) in retention mode;
- a SS Retention data configuration information comprising Cell-Specific Reference Signal (CRS), scrambling, identifiers, retransmission schemes, etc.

According to some embodiments, the SS Retention Configuration may be configured and transmitted via dedicated transmissions during active mode, or via broadcast information.

The serving base station RBS 111 may also request neighboring Base Stations to transmit beam formed SS in the direction of the UE, for example based on beam relations between the Base Stations.

Figure 7:
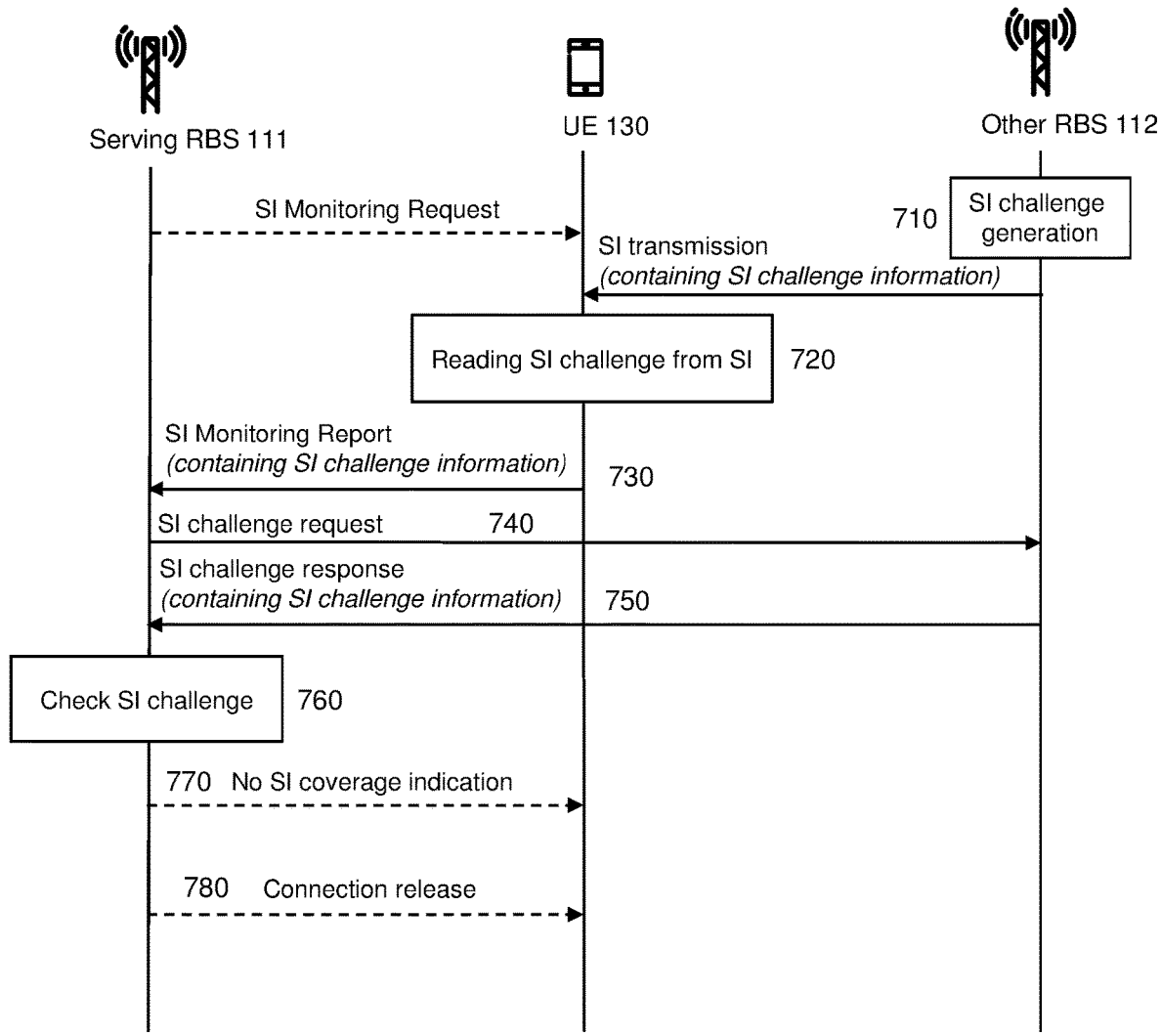
FIG. 7 is a signaling diagram illustrating embodiments of a method in a network node.

FIG. 7 depicts an alternative embodiment for monitoring inactive mode coverage for a UE, involving transmitting a message in the broadcasted system information (SI) from a potential target network node. In this example embodiment, a specific information element is broadcasted, herein referred to as SI challenge information, for enabling the serving network node RBS 111 to verify that the UE 130 actually succeeded in reading the system information transmitted from another target RBS. The serving network node RBS 111 can use the SI challenge information to verify that the UE 130 actually succeeded in reading the system information transmitted from another target RBS. So the SI challenge information is information that the UE 130 would not be able to retrieve if it could not read the SI. As shown in FIG. 7, the embodiment comprises the following actions or steps:

The potential target network node, e.g. the network node RBS 112, generates, in step 710, SI challenge information and broadcasts it via system information (SI) broadcast;

The UE 130 receives SI containing the SI challenge information from the network node RBS 112 and read the SI challenge information, in step 720;

The UE 130 sends a SI monitoring report containing the SI challenge information, in step 730;

The serving network node RBS 111 sends a SI challenge request to the network node 112, in step 740; The network node RBS 112 sends a SI challenge response containing SI challenge information to the serving network node RBS 111, in step 750;

The serving network node RBS 111 checks the SI challenge information received from the UE 130 and the network node RBS 112, in step 760, to determine if the UE 130 actually succeeded in reading the system information transmitted from the network node 112;

If it is determined that the UE 130 is not able to read the SI, the network node RBS 112 may send a No SI coverage indication to the UE 130, in step 770; and/or the network node 112 may release the connection to the UE 130, in step 780.

Example Embodiments will be described in the following.

Figure 8:
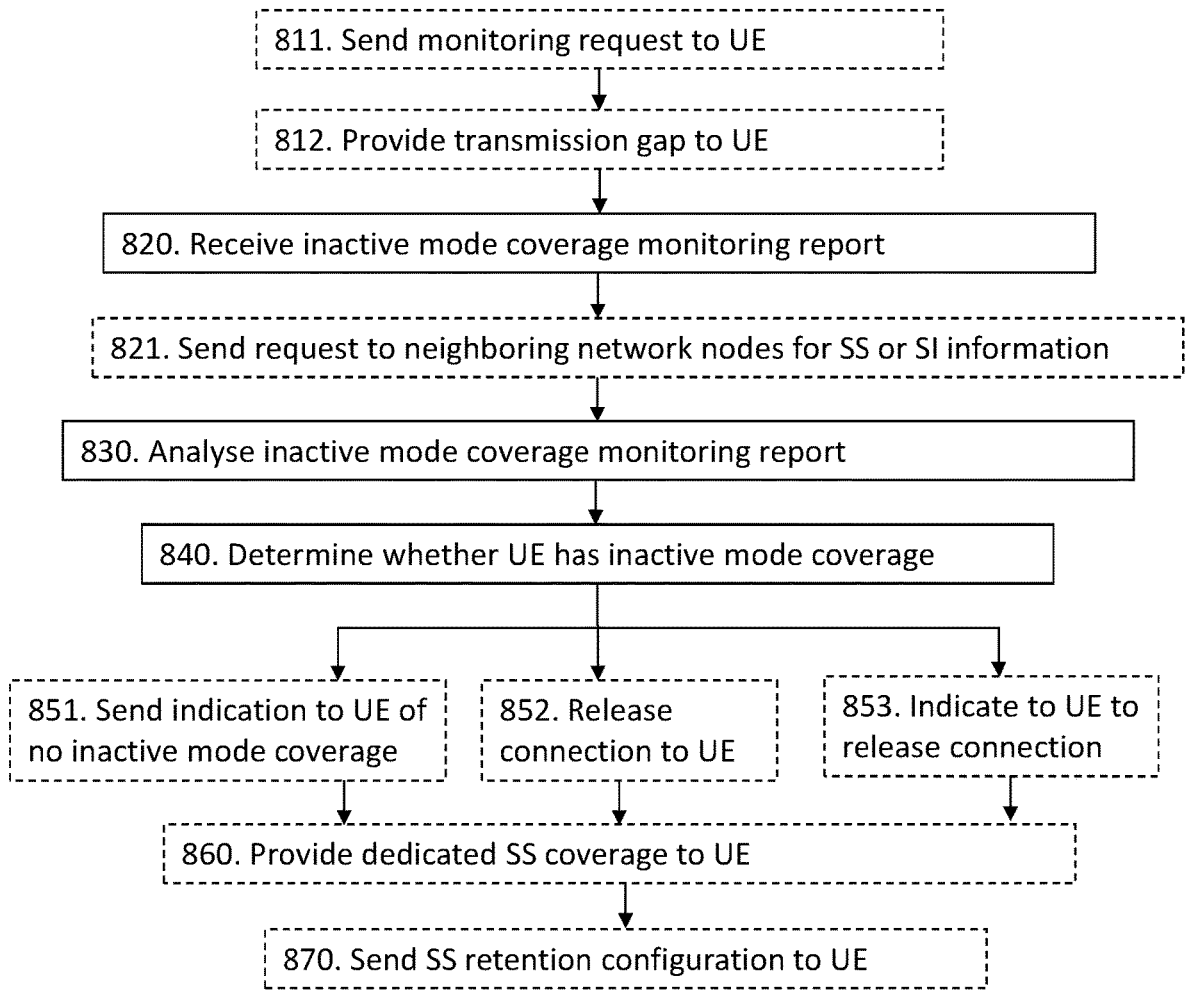
FIG. 8 is a flowchart depicting embodiments of a method performed in a network node.

FIG. 8 illustrates actions of a method according to embodiments herein from a first network node 111 perspective in a wireless communication network 100. A plurality of network nodes operates in the wireless communication network 100 and the first network node 111 is a serving network node for the user equipment. The actions depicted in the dashed line box are optional and the actions may be performed in different order.

Action 811

The first network node 111 may send a monitoring request to the user equipment 130 to monitor SSs or SI of the wireless communication network.

According to some embodiments, the first network node 111 may send a monitoring request via enhancements to the Radio Resource Control (RRC) Connection Reconfiguration.

Action 812

The first network node 111 may provide a transmission gap or several transmission gaps to the UE 130 for measuring SSs or SI of the wireless communication network 100.

According to some embodiments, the user equipment 130 may be configured to keep measuring SS from the serving network node 111, at least at some occasions, and/or detect and measure neighbour SSs from neighbour network nodes, at least at some occasions.

Action 820

The first network node 111 receives an inactive mode coverage monitoring report.

According to some embodiments, the inactive mode coverage monitoring report comprises synchronization signals, SSs, monitoring report or system information, SI, signal monitoring report.

Action 821

The first network node 111 may send a request to neighboring network nodes for SS or SI information.

According to some embodiments, the first network node 111 may send a request to neighbouring network nodes for SS information to be used in analysing the monitoring report. The SS information may comprise SS periodicity and/or SS transmission occasions.

According to some embodiments, the first network node 111 may receive the SI signal monitoring report from the user equipment 130 and the SI signal monitoring report comprises SI challenge information received by the user equipment 130 from a target network node.

According to some embodiments, the first network node 111 may send a SI challenge request to a target network node and receive a SI challenge response containing a SI challenge information from the target network node to be used in analysing the monitoring report.

Action 830

The first network node 111 analyses the inactive mode coverage monitoring report to determine whether the user equipment 130 has inactive mode coverage based on the outcome of analysing the inactive mode coverage monitoring report.

Action 840

The first network node 111 determines whether the user equipment 130 has inactive mode coverage based on the analyses of the inactive mode coverage monitoring report.

According to some embodiments, when it is determined from the monitoring report analysis that the UE 130 does not have Inactive Mode Coverage, the first network node 111 may perform the following actions:

Action 851

The first network node 111 send an indication to the user equipment 130 for informing the user equipment 130 of no inactive mode coverage.

Action 852

The first network node 111 may release the connection to the user equipment 130.

Action 853

The first network node 111 may indicate to the user equipment 130 that the connection will be released after a timer has expired. In this case, the first network node 111 may receive from the user equipment 130 a request to prolong the timer.

To help the UE 130 to reconnect to the network when it enters into an inactive mode coverage hole, the following actions may be performed:

Action 860

The first network node 111 may provide a dedicated SS coverage to the user equipment 130.

Action 870

The first network node 111 may send a SS retention configuration to the user equipment 130.

According to some embodiments, the retention configuration may comprise any one of:

a) a SS Retention Timer value;

b) a SS Retention search space or time-frequency resources where the dedicated SS is transmitted;

c) a random access and/or random access response configuration for Random Access (RA) in retention mode;

d) a SS Retention data configuration information comprising Cell-Specific Reference Signal (CRS), scrambling, identifiers, retransmission schemes.

According to some embodiments, the SS Retention Configuration may be transmitted via dedicated transmissions during active mode, or via broadcast information.

According to some embodiments, the first network node 111 may request neighbouring network nodes to transmit beam formed SS in a direction of the user equipment 130.

In order to decrease the signaling needed for determining if the UE 130 has inactive mode coverage, there are some different ways depending on how the first network node 111 is configured.

According to one embodiment, the UE 130 may not send the SS Monitoring report in case no SS was found, i.e. no SS Monitoring report is received in the serving base station RBS 111. The absence of an SS Monitoring Report from the UE 130 may be then interpreted as a negative-acknowledgement (NACK), i.e. that the UE 130 do not have SS Coverage, by the serving base station RBS 111.

According to one embodiment, the UE 130 may not send the SS Monitoring report in case one or more SS is found. The absence of an SS Monitoring Report from the UE 130 may then be interpreted as an indication of SS Coverage by the serving base station 111.

In this case, in Action 820 where the first network node 111 receives an inactive mode coverage monitoring report may be interpreted such that if there is no inactive mode coverage monitoring report received by the serving network node 111, the serving network node 111 may be configured to determine that the UE 130 has no inactive mode coverage.

Alternatively, if there is no inactive mode coverage monitoring report received by the serving network node 111, the serving network node 111 may be configured to determine that the UE 130 has inactive mode coverage.

Figure 9:
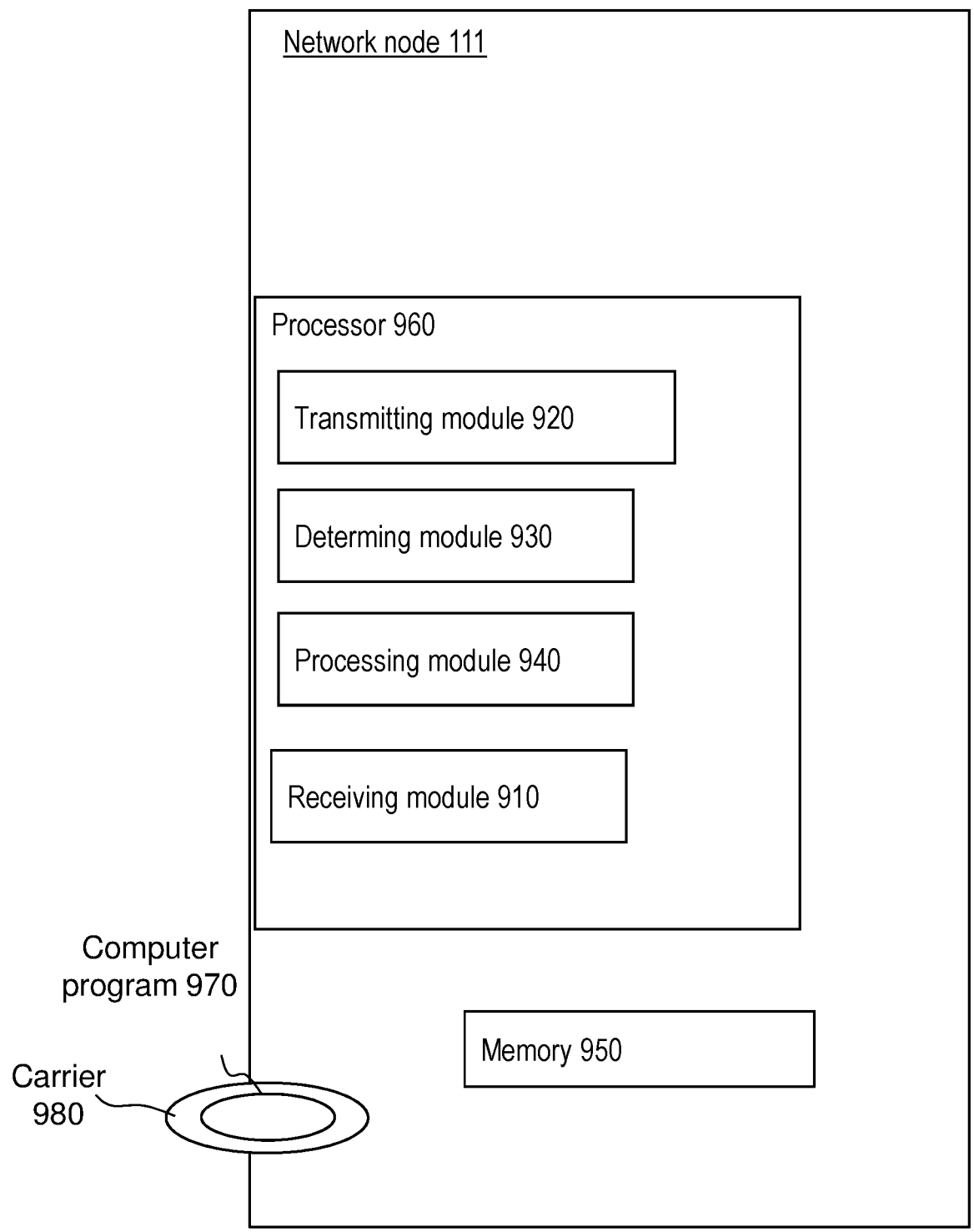
FIG. 9 is a schematic block diagram illustrating example embodiment of a network node.

To perform the method actions in the first network node 111, an example embodiment of the network node 111 is depicted in FIG. 9. FIG. 9 is a schematic block diagram illustrating a first network node 111 for monitoring inactive mode coverage for a user equipment 130 in a wireless communication network 100, wherein a plurality of network nodes 111 112 operate in the wireless communication network 100. The first network node 111 is a serving network node for the user equipment 130.

The first network node 111 comprises a receiving module 910, a transmitting module 920, a determining module 930, a processing module 940, a memory 950 etc.

The first network node 111 is configured to, by means of e.g. the receiving module 910 being configured to, receive an inactive mode coverage monitoring report.

The first network node 111 is further configured to, by means of e.g. the determining module 930 being configured to, analyse the inactive mode coverage monitoring report and determine whether the user equipment 130 has inactive mode coverage based on the outcome of analysing the inactive mode coverage monitoring report.

According to some embodiments, the inactive mode coverage monitoring report may comprise synchronization signals, SSs, monitoring report or system information, SI, signal monitoring report.

According to some embodiments, the first network node 111 may be further configured to, by means of e.g. the transmitting module 920 being configured to, send a monitoring request to the user equipment to monitor SSs or SI of the wireless communication network.

According to some embodiments, the first network node 111 may further be configured to, by means of e.g. the transmitting module 920 being configured to, send a monitoring request via enhancements to the Radio Resource Control (RRC) Connection Reconfiguration.

According to some embodiments, the first network node 111 may be further configured to, by means of e.g. the transmitting module 920 being configured to, provide a transmission gap or several transmission gaps to the UE 130 for measuring SSs or SI of the wireless communication network 100.

According to some embodiments, the user equipment 130 may be configured to keep measuring SS from the serving network node 111, at least at some occasions, and/or detect and measure neighbour SSs from neighbour network nodes, at least at some occasions.

According to some embodiments, the first network node 111 may be further configured to, by means of e.g. the transmitting module 920 being configured to, send a request to neighbouring network nodes for SS information to be used in analysing the monitoring report. The SS information may comprise SS periodicity and/or SS transmission occasions.

According to some embodiments, the first network node 111 may be further configured to, by means of e.g. the receiving module 910 being configured to, receive the SI signal monitoring report from the user equipment 130 and the SI signal monitoring report comprises SI challenge information received by the user equipment 130 from a target network node.

According to some embodiments, the first network node 111 may be further configured to, by means of e.g. the transmitting module 920 being configured to, send a SI challenge request to a target network node and receive a SI challenge response containing a SI challenge information from the target network node to be used in analysing the monitoring report.

According to some embodiments, when it is determined from the inactive mode coverage monitoring report analysis that the UE 130 does not have Inactive Mode Coverage, the first network node 111 may be further configured to send an indication to the user equipment 130 for informing the user equipment 130 of no inactive mode coverage. Alternatively, the first network node 111 may be further configured to release the connection to the user equipment 130 or to indicate to the user equipment 130 that the connection will be released after a timer has expired. In this case, the first network node 111 may receive from the user equipment 130 a request to prolong the timer.

According to some embodiments, the first network node 111 may be further configured to provide a dedicated SS coverage to the user equipment 130.

According to some embodiments, the first network node 111 may be further configured to send a SS retention configuration to the user equipment 130.

According to some embodiments, the retention configuration may comprise any one of:

a) a SS Retention Timer value;

b) a SS Retention search space or time-frequency resources where the dedicated SS is transmitted;

c) a random access and/or random access response configuration for Random Access (RA) in retention mode;

d) a SS Retention data configuration information comprising Cell-Specific Reference Signal (CRS), scrambling, identifiers, retransmission schemes.

According to some embodiments, the SS Retention Configuration may be transmitted via dedicated transmissions during active mode, or via broadcast information.

According to some embodiments, the first network node 111 may be further configured to request neighbouring network nodes to transmit beam formed SS in a direction of the user equipment 130.

According to some embodiments, the serving network node 111 may be configured to determine that the UE 130 has inactive mode coverage if there is no inactive mode coverage monitoring report received.

According to some embodiments, the serving network node 111 may be configured to determine that the UE 130 has no inactive mode coverage if there is no inactive mode coverage monitoring report received.

Those skilled in the art will appreciate that the receiving module 910, the determining module 930 and the transmitting module 920 described above in the network node 111 may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for monitoring inactive mode coverage for a user equipment 130 in the wireless communication network 100, may be implemented through one or more processors, such as the processor 960 in the network node 111 together with computer program code 970 for performing the functions and actions of the embodiments herein. The program code 970 mentioned above may also be provided as a computer program product, for instance in the form of a data carrier 980 carrying computer program code for performing the embodiments herein when being loaded into the network node 111. One such carrier may be in the form of a CD ROM disc. It is however feasible with other data carriers such as a memory stick. The computer program code 970 may furthermore be provided as pure program code on a server and downloaded to the network node 111.

The memory 950 in the network node 111 may comprise one or more memory units and may be arranged to be used to store received information, measurements, data, configurations and applications to perform the methods herein when being executed in the network node 111.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a Memory Stick, a Multimedia Card (MMC), all may be referred to data carrier 980 as shown in FIG. 9 etc.

As used herein, the term "computer program code" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

The invention claimed is:

1. A method in a first network node for monitoring inactive mode coverage for a user equipment (UE) in a wireless communication network, wherein a plurality of network nodes operate in the wireless communication network, the first network node is a serving network node for the UE, the method comprising:
   receiving an inactive mode coverage monitoring report transmitted by the UE;
   analyzing the received inactive mode coverage monitoring report transmitted by the UE; and
   determining, based on the outcome of analyzing the received inactive mode coverage monitoring report, that the UE is unable to detect any synchronization signal (SS) and/or that the UE is unable to successfully read system information (SI) signal transmitted by a second network node;
   as a result of determining that the UE is unable to detect any synchronization signal (SS) or that the UE is unable to successfully read the system information (SI) signal transmitted by the second network node, performing one or more of the following steps:
   i) sending an indication to the UE for informing the UE of no inactive mode coverage,
   ii) releasing a connection to the UE, or
   iii) indicating to the UE that a connection to the UE will be released after a timer has expired.

2. The method of claim 1, wherein the inactive mode coverage monitoring report comprises synchronization signals (SSs) monitoring report or system information (SI) signal monitoring report.

3. The method of claim 2, further comprising:
   sending a monitoring request toward the UE to monitor a SS or a SI signal of the wireless communication network.

4. The method of claim 3, wherein the sending of the monitoring request is performed via enhancements to Radio Resource Control (RRC) Connection Reconfiguration.

5. The method of claim 2, further comprising:
   providing a transmission gap or several transmission gaps to the UE for measuring a SS or a SI signal of the wireless communication network.

6. The method of claim 2, wherein the UE is configured to keep measuring a SS from the serving network node and/or to measure a SS from a neighbor network node.

7. The method of claim 2, wherein the SI signal monitoring report comprises SI challenge information transmitted from a target network node.

8. The method of claim 2, further comprising:
   sending a SI challenge request toward a target network node; and
   receiving a SI challenge response transmitted from the target network node, wherein
   the SI challenge response contains SI challenge information to be used in analyzing the monitoring report.

9. The method of claim 1, further comprising:
   sending a request toward neighboring network nodes for SS information to be used in analyzing the monitoring report.

10. The method of claim 9, wherein the SS information comprises SS periodicity and/or SS transmission occasions.

11. The method of claim 1, further comprising:
    receiving a request to prolong the timer, wherein the request was transmitted by the UE.

12. The method of claim 1, further comprising:
    providing a dedicated synchronization signal coverage to the UE.

13. The method of claim 12, further comprising:
    sending a SS retention configuration toward the UE.

14. The method of claim 13, wherein the SS retention configuration comprises any one of:
    a) a SS Retention Timer value;
    b) a SS Retention search space or time-frequency resources where a dedicated SS is transmitted;
    c) a random access and/or random access response configuration for Random Access (RA) in retention mode; and
    d) a SS Retention data configuration information comprising Cell-Specific Reference Signal (CRS), scrambling, identifiers, retransmission schemes.

15. The method of claim 13, wherein the SS retention configuration is transmitted via dedicated transmissions during active mode, or via broadcast information.

16. The method of claim 1, further comprising:
    requesting neighboring network nodes to transmit beam formed synchronization signal in a direction of the UE.

17. A first network node for monitoring inactive mode coverage for a user equipment (UE) in a wireless communication network, wherein a plurality of network nodes operate in the wireless communication network, the first network node is a serving network node for the UE, the first network node comprising:
    a receiver for receiving an inactive mode coverage monitoring report transmitted by the UE; and
    processing circuitry coupled to the receiver and configured to:
    analyze the received inactive mode coverage monitoring report transmitted by the UE;
    and
    determine that the UE is unable to detect any synchronization signal (SS) as a result of the processing circuitry determining that the inactive mode coverage monitoring report indicates that the UE is unable to receive any SS and/or determine that the UE is unable to successfully read system information (SI) signal transmitted by a second network node as a result of the processing circuitry determining that information included in the coverage monitoring report does not match information transmitted by the second network node;
    wherein the processing circuitry is configured such that as a result of the processing circuitry determining that the UE is unable to detect any synchronization signal (SS) or that the UE is unable to successfully read the system information (SI) signal transmitted by the second network node, the processing circuitry is further configured to trigger the first network node to perform one or more of the following steps:
    i) sending an indication to the UE for informing the UE of no inactive mode coverage,
    ii) releasing a connection to the UE, and
    iii) indicating to the UE that a connection to the UE will be released after a timer has expired.

18. The first network node of claim 17, wherein the inactive mode coverage monitoring report comprises synchronization signals (SSs) monitoring report or system information (SI) signal monitoring report.

19. The first network node of claim 18, wherein the SI signal monitoring report comprises SI challenge information transmitted from a target network node.

20. The first network node of claim 18, further comprising:
    a transmitter for sending a SI challenge request toward a target network node; and a receiver for receiving a SI challenge response transmitted from the target network node, wherein
the SI challenge response contains SI challenge information to be used in analyzing the monitoring report.

21. The first network node of claim 17, further comprising:
a transmitter for sending a monitoring request toward the UE to monitor a SS or a SI signal of the wireless communication network.

22. The first network node of claim 21, wherein the sending of the monitoring request is performed via enhancements to Radio Resource Control (RRC) Connection Reconfiguration.

23. The first network node of claim 17, wherein the processing circuitry is further configured to trigger the first network node to provide a transmission gap or several transmission gaps to the UE for measuring a SS or a SI signal of the wireless communication network.

24. The first network node of claim 17, wherein the UE is configured to keep measuring a SS from the serving network node and/or to measure a SS from a neighbor network node.

25. The first network node of claim 17, further comprising:
a transmitter for sending a request toward neighboring network nodes for SS information to be used in analyzing the monitoring report.

26. The first network node of claim 25, wherein the SS information comprises SS periodicity and/or SS transmission occasions.

27. The first network node of claim 17, wherein receiver is configured to:
receive a request to prolong the timer, wherein the request was transmitted by the UE.

28. The first network node of claim 17, wherein the processing circuitry is further configured to:
trigger the first network node to provide a dedicated synchronization signal (SS) coverage to the UE.

29. The first network node of claim 28, further comprising:
a transmitter for sending a SS retention configuration toward the UE.

30. The first network node of claim 29, wherein SS the retention configuration comprises any one of:

e) a SS Retention Timer value;
f) a SS Retention search space or time-frequency resources where a dedicated SS is transmitted;
g) a random access and/or random access response configuration for Random Access (RA) in retention mode;
h) a SS Retention data configuration information comprising Cell-Specific Reference Signal (CRS), scrambling, identifiers, retransmission schemes.

31. The first network node of claim 29, wherein the SS retention configuration is transmitted via dedicated transmissions during active mode, or via broadcast information.

32. The first network node of claim 17, wherein the processing circuitry is further configured to:
trigger the first network node to request neighboring network nodes to transmit a beam formed synchronization signal (SS) in a direction of the UE.

33. A method in a first network node for monitoring inactive mode coverage for a user equipment (UE) in a wireless communication network, wherein a plurality of network nodes operate in the wireless communication network, the first network node is a serving network node for the UE, the method comprising:
receiving an inactive mode coverage monitoring report transmitted by the UE;
analyzing the received inactive mode coverage monitoring report transmitted by the UE;
determining, based on the outcome of analyzing the received inactive mode coverage monitoring report, whether the UE is unable to detect any synchronization signal (SS) or whether the UE is unable to successfully read system information (SI) signal transmitted by a second network node; and
as a result of determining that the UE is unable to detect any synchronization signal (SS) or that the UE is unable to successfully read the system information (SI) signal transmitted by the second network node, performing one or more of the following steps:
i) sending an indication to the UE for informing the UE of no inactive mode coverage,
ii) releasing a connection to the UE, or
iii) indicating to the UE that a connection to the UE will be released after a timer has expired.

* * * * *